United States Patent Office 2,849,324
Patented Aug. 26, 1958

2,849,324

POLISHING COMPOSITION

Marvin E. Cox, Oaklawn, Ill., assignor to Simoniz Company, a corporation of Delaware No Drawing. Application November 19, 1956
Serial No. 622,770

11 Claims. (Cl. 106—10)

This invention relates to polishing compositions.

In the U. S. patent of Paul E. Wenaas, 2,681,859, dated June 22, 1954, and included in this application by reference, there is disclosed and claimed a liquid polishing composition including a solvent and a wax both dissolved and dispersed therein at ordinary room temperatures so that the composition contains small discrete particles comprising wax. The composition also includes a silicone fluid dissolved in the solvent. Liquid polishing compositions of this type have been found to be particularly useful in applying protective coatings to surfaces and to give these surfaces a high luster. The composition, after it has been applied and dried, requires relatively little rubbing to produce a high polish.

The preferred method of making the polish of this invention is disclosed and claimed in the copending application of Paul E. Wenaas and Carl S. Miner, Jr., Serial No. 569,691, filed March 6, 1956, and assigned to the same assignee as is the present invention.

The liquid polishing composition of this invention preferably includes about 78 parts by weight of a solvent, about 0.75–7.25 parts by weight of a wax, about 0–5.45 parts by weight of silicone fluid, and up to 5.45 parts by weight of an aqueous solution of a solute, the solution having a specific gravity at least equal to that of the undissolved portion of the wax, and preferably greater. In certain instances, such as in producing an automobile polish, or the like, from 0 to about 1.5 parts by weight of an additive may be included. The upper limits of the ranges of the wax and silicone amounts are somewhat higher than those in the above-mentioned Wenaas patent.

The undissolved portion of the wax, which is contained in the small particles, apparently aids in obtaining a smooth uniform coating of the polish and of the wax on the treated surface.

Liquid polishes containing liquid silicones have been widely used for a number of years and have been quite satisfactory. The polish composition of this invention permits producing a polish having all the desirable features of a silicone-containing polish in ease of application and wipe-off, long life, high gloss, water resistance, and surface protection while using either no silicone at all or using less silicone than was previously thought possible. This is accomplished by using as a replacement for all or part of the silicone an aqueous solution of a solute in which the solution has a specific gravity greater than that of the undissolved portion of the wax in the polish composition. In the preferred embodiments, this aqueous solution contains at least 10 parts by weight of the solute per 100 parts by weight of solution. The amount of solute can be used in high enough proportions substantially to saturate the aqueous solution.

One of the features of this invention, therefore, is to provide a polish composition comprising a wax, a solvent for the wax, and a discontinuous phase in small droplet form of an aqueous solution of a solute.

Another feature of the invention is to provide a polish composition comprising about 0.75–7.25 parts by weight of a wax, about 78 parts by weight of solvent for the wax in which the wax is both dissolved and dispersed, up to 5.45 parts by weight of polydimethylsiloxane, and up to about 5.45 parts by weight of a discontinuous phase in small droplet form of an aqueous solution of a solute, the aqueous solution containing at least 10 parts by weight of solute per 100 parts by weight of solution and the aqueous solution having a specific gravity at least equal to, and preferably greater than, that of the particles of undissolved wax.

Other features and advantages of the invention will be apparent from the following description of the invention including certain embodiments thereof.

The solutes that are used in this invention to produce the aqueous solutions are preferably those that have at least some hygroscopicity, that are completely soluble in the water at the concentrations used, and that do not harm the finish to which the polish is applied. The amount of solute used to make the aqueous solutions is preferably at least 10 parts by weight per 100 parts by weight of the aqueous solution, with the amount preferably being approximately 30–35% of that sufficient to saturate the solution at ordinary room temperature. Preferred solutes include calcium chloride, sodium thiosulfate, sodium nitrate, copper nitrate, urea, magnesium chloride, sodium chloride, potassium bromide, magnesium sulfate, lithium chloride, and dibasic ammonium citrate.

In producing the polish of this invention, about 4 to about 93%, and preferably about 7 to about 37%, of the total amount of solvent is first heated and the melted wax is added to the heated solvent to produce a wax concentrate solution. The aqueous solution is preferably added to the concentrate while the mixture is violently agitated. The temperature of this concentrate is preferably maintained between about 130–200° F. with the preferred temperature being about 5–10° F. above the minimum temperature required to keep the wax in solution. The amount of solvent in the concentrate and the temperature of the concentrate should be sufficient to dissolve all of the wax. Preferably, the concentrate contains about 1.1–4.2 pounds of wax per gallon of concentrate.

This heated concentrate is then added to the remaining portion of the solvent while this remaining portion is maintained at a fixed temperature that is preferably between about 35–90° F. and that preferably does not vary over about 5° F. during the addition of the concentrate. During the addition the mixture is gently stirred so as to obtain thorough mixing without excessive agitation.

As the concentrate is thusly added to the cooled solvent, the excess wax precipitates out and fine, substantially uniform, particles are produced. This composition, when used in a polish, is easy to apply and covers the surface substantially uniformly.

When the silicone fluid is used in the polishing composition, this silicone may be added at any point in the above-described process. When an additive, such as wool wax alcohol, is used in the polishing composition, this additive is preferably added to the heated concentrate.

In the preferred method when the solvent is a hydrocarbon mineral spirit, the wax is an oxidized microcrystalline wax and the silicone is a dimethylpolysiloxane fluid, the amount of solvent in the concentrate is preferably about 15–17% of the total solvent and the temperature of the cooled solvent and of the mixture of solvent and concentrate during the addition is dependent at least in part on the concentration of the wax in the concentrate. Thus, when the amount of wax in the concentrate is between about 2.4–2.7 pounds per gallon, the temperature of the mixture is preferably maintained at about 60° F.

In general, about 4% to about 93%, and preferably from about 7 to about 37%, of the total solvent should be used in the concentrate. Where the amount of solvent in the concentrate is at the high end of the range, the temperature of the concentrate should be at the low end of the temperature range. Similarly, when the solvent is at the low end of its range, the temperature should be at the high end of its range.

The preferred solvents are hydrocarbon solvents and specifically naphthas. Among the suitable solvents are "Amsco Naphthol Mineral Spirits"; Amsco LEP solvent made by American Mineral Spirits Co. and having an initial boiling point of 313° F. and a dry end point of 349° F.; "Amsco Naphthol Spirits" also made by American Mineral Spirits Co., having an initial boiling point of 307° F. and a dry end point of 337° F.; "Shell 360" solvent made by Shell Oil Company and having an initial boiling point of 310° F. and a dry end point of 355° F.; "Skellysolve S–2" made by Skelly Oil Company and having an initial boiling point of 309° F. and a dry end point of 326° F.; and "Amsco Special Naphthol" made by American Mineral Spirits Co. and having an initial boiling point of 310° F. and a dry end point of 349° F.

Among the waxes that may be used in this invention are microcrystalline waxes, oxidized microcrystalline waxes, polyethylene, oxidized polyethylene, carnauba, beeswax, a wax made from hydrogenating castor oil, and mixtures thereof.

A wax that has been found effective is a microcrystalline wax and preferably an oxidized microcrystalline wax. An excellent wax for this purpose is "Crown 23" oxidized microcrystalline wax made by the Petrolite division of Bareco Wax Company.

The liquid silicone fluid that may be used in this invention includes those containing chains of alkyl-siloxane units, especially dialkylsiloxane units, and preferably dimethylpolysiloxane units. These silicone fluids preferably have a viscosity of about 20 to about 1,000 centistokes at 100° F. Preferable dimethylpolysiloxanes are "DC–200" and "GE–SF–96," each within a range of about 40 to about 300 centistokes viscosity when measured at 100° F. Other suitable silicone fluids include the following: A polysiloxane containing 90% dimethyl groups and 10% methyl phenyl groups identified as "DC–510," polymethylvinylsiloxane identified as "RXF–522," a silicone resin of the methyl phenyl copolymer siloxane containing from about 30 mol percent to about 95 mol percent of trifunctional silicone atoms in which the ratio of methyl to phenyl groups is between 80:20 to 20:80 and identified as "General Electric 81556" (formerly identified as "GE 81531"), a dimethylpolysiloxane of 10,000 centistokes viscosity with the end of the molecule containing a monofunctional polysiloxane group and identified as General Electric "Viscasil 10,000," and methyl chlorophenylpolysiloxane, which is a copolymer containing about 83% of methyl groups and about 17% chlorophenyl groups with about 3–10% of the polysiloxane being chlorine and identified as "General Electric 81406."

In one example of preparing a furniture polish according to the methods of this invention, 42.5 parts by weight of Crown 23 wax were melted at a temperature not exceeding 220° F. The melted wax was added to 115 parts by weight "Skellysolve S–2" solvent maintained at a temperature between 150 and 170° F. and the mixture stirred until all the wax had been dissolved. To this hot concentrate was then added 18 parts by weight of calcium chloride dihydrate dissolved in 45 parts by weight of water and this mixture was then emulsified by agitating the concentrate in a Brookfield counter-rotating mixer for one-half hour with the temperature between 150 and 170° F. to maintain the wax in liquid form. This concentrate was then added to 705 parts by weight of "Skellysolve S–2" solvent which was cooled to a temperature of about 60° F. before and during the addition. The concentrate was added in the form of a coarse spray while the cool solvent mixture was gently agitated. Agitation was then continued while the temperature was permitted to rise slowly to room temperature. If desired, any suitable type of dye may be added depending upon the shade of furniture surface upon which the polish is to be used.

The excess wax in the above furniture polish was found to be contained in the small, discrete, substantially uniform particles that were produced. At this point, 6.3 parts by weight of General Electric dimethylpolysiloxane fluid having a viscosity of 300 centistokes at 100° F. were added and thoroughly mixed in to complete the polish.

In the following additional examples, the same steps of preparation, the same division of solvent between the concentrate and the remainder of the polish, the same temperatures, and the same other conditions were maintained except as otherwise indicated in these tabulated examples:

[Parts by weight.]

|  | Examples | | | | | | |
| --- | --- | --- | --- | --- | --- | --- | --- |
|  | 2 | 3 | 4 | 5 | 6 | 7 | 8 |
| Oxidized microcrystalline wax | 47.2 | 47.2 | 47.2 | 47.2 | 47.2 | 47.2 | 47.2 |
| Hydrocarbon solvent in hot concentrate | 138 | 138 | 138 | 138 | 138 | 138 | 138 |
| Calcium chloride dihydrate | 28 | 34 | 39 | 45 | 50 | 50 | 50 |
| Distilled water | 28 | 34 | 39 | 45 | 50 | 50 | 50 |
| Hydrocarbon solvent in cold kettle | 827 | 827 | 827 | 827 | 827 | 827 | 827 |
| Polydimethylsiloxane of 300 centistokes vis. at 100° C | 13 | 11 | 10 | 9 | 7 | 3 | 6 |

[Percent by weight.]

|  | Examples | | | | |
| --- | --- | --- | --- | --- | --- |
|  | 9 | 10 | 11 | 12 | 13 |
| Oxidized microcrystalline wax | 4.13 | 4.54 | 4.40 | 4.58 | 4.24 |
| Hydrogenated castor oil | 0.19 |  | 0.19 |  |  |
| Hydrocarbon solvent in hot concentrate | 27.49 | 12.18 | 28.50 | 12.22 | 11.48 |
| Distilled water | 4.68 | 4.81 | 4.86 | 4.84 | 4.50 |
| Sodium chloride |  | 1.60 | 1.62 | 1.07 |  |
| Calcium chloride dihydrate |  |  |  |  | 4.50 |
| Urea | 4.68 |  |  |  |  |
| Hydrocarbon solvent in cold kettle | 57.79 | 75.43 | 60.43 | 75.84 | 74.38 |
| Polydimethylsiloxane of 300 centistokes vis. at 100° C | 1.04 | 1.44 | 0.00 | 1.45 | 0.90 |

The term "wax" used herein is intended to include the true waxes as well as wax-like materials.

Having described my invention as related to certain embodiments thereof, it is my intention that the invention be not limited by any of the details of description, unless otherwise specified, but rather be construed broadly within its spirit and scope as set out in the accompanying claims.

I claim:

1. A polish composition, consisting essentially of: a wax; a solvent for said wax, a portion of the wax being in the form of small, discrete, undissolved particles; and a discontinuous phase in small droplet form of an aqueous solution of a solute of the class consisting of calcium chloride, sodium thiosulfate, sodium nitrate, copper nitrate, urea, magnesium chloride, sodium chloride, potassium bromide, magnesium sulfate, lithium chloride and dibasic ammonium citrate.

2. A polish composition, consisting essentially of: a wax; a solvent for said wax, a portion of the wax being in the form of small, discrete, undissolved particles; and a discontinuous phase in small droplet form of an aqueous solution of a solute of the class consisting of calcium chloride, sodium thiosulfate, sodium nitrate, copper nitrate, urea, magnesium chloride, sodium chloride, potassium bromide, magnesium sulfate, lithium chloride and dibasic ammonium citrate, said aqueous solution containing at least 10 parts by weight of solute per 100 parts by weight of solution.

3. A polish composition, consisting essentially of: about 0.75–7.25 parts by weight of a wax; about 78 parts by weight of solvent for said wax in which the wax is both dissolved and dispersed; and up to about 5.45 parts by weight of a discontinuous phase in small droplet form of an aqueous solution of a solute of the class consisting of calcium chloride, sodium thiosulfate, sodium nitrate, copper nitrate, urea, magnesium chloride, sodium chloride, potassium bromide, magnesium sulfate, lithium chloride and dibasic ammonium citrate, said aqueous solution containing at least 10 parts by weight of solute per 100 parts by weight of solution.

4. A polish composition, consisting essentially of: a wax; a solvent for said wax, a portion of the wax being in the form of small, discrete, undissolved particles; a polysiloxane liquid; and a discontinuous phase in small droplet form of an aqueous solution of a solute of the class consisting of calcium chloride, sodium thiosulfate, sodium nitrate, copper nitrate, urea, magnesium chloride, sodium chloride, potassium bromide, magnesium sulfate, lithium chloride and dibasic ammonium citrate.

5. A polish composition, consisting essentially of: about 0.75–7.25 parts by weight of a wax; about 78 parts by weight of solvent for said wax in which the wax is both dissolved and dispersed; up to 5.45 parts by weight of a polysiloxane liquid; and up to about 5.45 parts by weight of a discontinuous phase in small droplet form of an aqueous solution of a solute of the class consisting of calcium chloride, sodium thiosulfate, sodium nitrate, copper nitrate, urea, magnesium chloride, sodium chloride, potassium bromide, magnesium sulfate, lithium chloride and dibasic ammonium citrate, said aqueous solution containing at least 10 parts by weight of solute per 100 parts by weight of solution.

6. A polish composition, consisting essentially of: about 0.75–7.25 parts by weight of a wax; about 78 parts by weight of solvent for said wax in which the wax is both dissolved and dispersed; up to 5.45 parts by weight of polydimethylsiloxane; and up to about 5.45 parts by weight of a discontinuous phase in small droplet form of an aqueous solution of a solute of the class consisting of calcium chloride, sodium thiosulfate, sodium nitrate, copper nitrate, urea, magnesium chloride, sodium chloride, potassium bromide, magnesium sulfate, lithium chloride and dibasic ammonium citrate.

7. A polish composition, consisting essentially of: about 0.75–7.25 parts by weight of a wax; about 78 parts by weight of solvent for said wax in which the wax is both dissolved and dispersed; up to 5.45 parts by weight of polydimethylsiloxane; and up to about 5.45 parts by weight of a discontinuous phase in small droplet form of an aqueous solution of calcium chloride, said aqueous solution containing at least 10 parts by weight of calcium chloride per 100 parts by weight of solution.

8. A polish composition, consisting essentially of: about 0.75–7.25 parts by weight of a wax; about 78 parts by weight of solvent for said wax in which the wax is both dissolved and dispersed; up to 5.45 parts by weight of polydimethylsiloxane; and up to about 5.45 parts by weight of a discontinuous phase in small droplet form of an aqueous solution of urea, said aqueous solution containing at least 10 parts by weight of urea per 100 parts by weight of solution.

9. A polish composition, consisting essentially of: about 0.75–7.25 parts by weight of a wax; about 78 parts by weight of solvent for said wax in which the wax is both dissolved and dispersed; up to 5.45 parts by weight of polydimethylsiloxane; and up to about 5.45 parts by weight of a discontinuous phase in small droplet form of an aqueous solution of sodium thiosulfate, said aqueous solution containing at least 10 parts by weight of sodium thiosulfate per 100 parts by weight of solution.

10. A polish composition, consisting essentially of: about 0.75–7.25 parts by weight of a wax; about 78 parts by weight of solvent for said wax in which the wax is both dissolved and dispersed; up to 5.45 parts by weight of polydimethylsiloxane; and up to about 5.45 parts by weight of a discontinuous phase in small droplet form of an aqueous solution of sodium chloride, said aqueous solution containing at least 10 parts by weight of sodium chloride per 100 parts by weight of solution.

11. A polish composition, consisting essentially of: about 0.75–7.25 parts by weight of a wax; about 78 parts by weight of solvent for said wax in which the wax is both dissolved and dispersed; up to 5.45 parts by weight of polydimethylsiloxane; and up to about 5.45 parts by weight of a discontinuous phase in small droplet form of an aqueous solution of dibasic ammonium citrate, said aqueous solution containing at least 10 parts by weight of dibasic ammonium citrate per 100 parts by weight of solution.

References Cited in the file of this patent

UNITED STATES PATENTS

| | | |
|---|---|---|
| 2,626,870 | Cooke et al. | Jan. 27, 1953 |
| 2,681,859 | Wenaas | June 22, 1954 |